(12) United States Patent
Oohara

(10) Patent No.: US 7,650,752 B2
(45) Date of Patent: Jan. 26, 2010

(54) DRIVE APPARATUS, DRIVE SYSTEM, AND DRIVE METHOD

(75) Inventor: Masamichi Oohara, Sakai (JP)

(73) Assignee: Konica Minolta Holdings, Inc., Tokyo (JP)

(*) Notice: Subject to any disclaimer, the term of this patent is extended or adjusted under 35 U.S.C. 154(b) by 728 days.

(21) Appl. No.: 11/294,512

(22) Filed: Dec. 5, 2005

(65) Prior Publication Data

US 2006/0150627 A1    Jul. 13, 2006

(30) Foreign Application Priority Data

Dec. 6, 2004    (JP)    ............................. 2004-352764

(51) Int. Cl.
*F01B 29/10*    (2006.01)

(52) U.S. Cl. ............................ 60/528; 60/529; 310/306; 310/307

(58) Field of Classification Search ........... 60/527–529; 310/306, 307
See application file for complete search history.

(56) References Cited

U.S. PATENT DOCUMENTS

| 4,932,210 A | * | 6/1990 | Julien et al. | ............... 60/527 |
| 6,516,146 B1 | * | 2/2003 | Kosaka | ............... 396/55 |
| 6,945,045 B2 | * | 9/2005 | Hara et al. | ............... 60/527 |

FOREIGN PATENT DOCUMENTS

JP    2003-111458 A    4/2003

* cited by examiner

*Primary Examiner*—Hoang M Nguyen
(74) *Attorney, Agent, or Firm*—Sidley Austin LLP

(57) ABSTRACT

An actuator has two shape memory alloys (SMAs) connected in a push-pull arrangement to a movable part. By passing current to each of the SMAs from a drive circuit part, the movable part can be driven. When a target position signal of the movable part is input to the drive circuit part, a current is passed to an SMA of the contraction side on the basis of a drive waveform obtained by adding a voltage according to the target position signal to a bias voltage, and a current is passed to the SMA on the expansion side on the basis of a signal waveform obtained by subtracting the voltage according to the target position signal from the bias voltage. Consequently, the SMA of the expansion side maintains a pre-heat state and is not cooled excessively, so that response delay at the time of the next heating can be prevented. As a result, the response of the actuator can be increased.

15 Claims, 13 Drawing Sheets

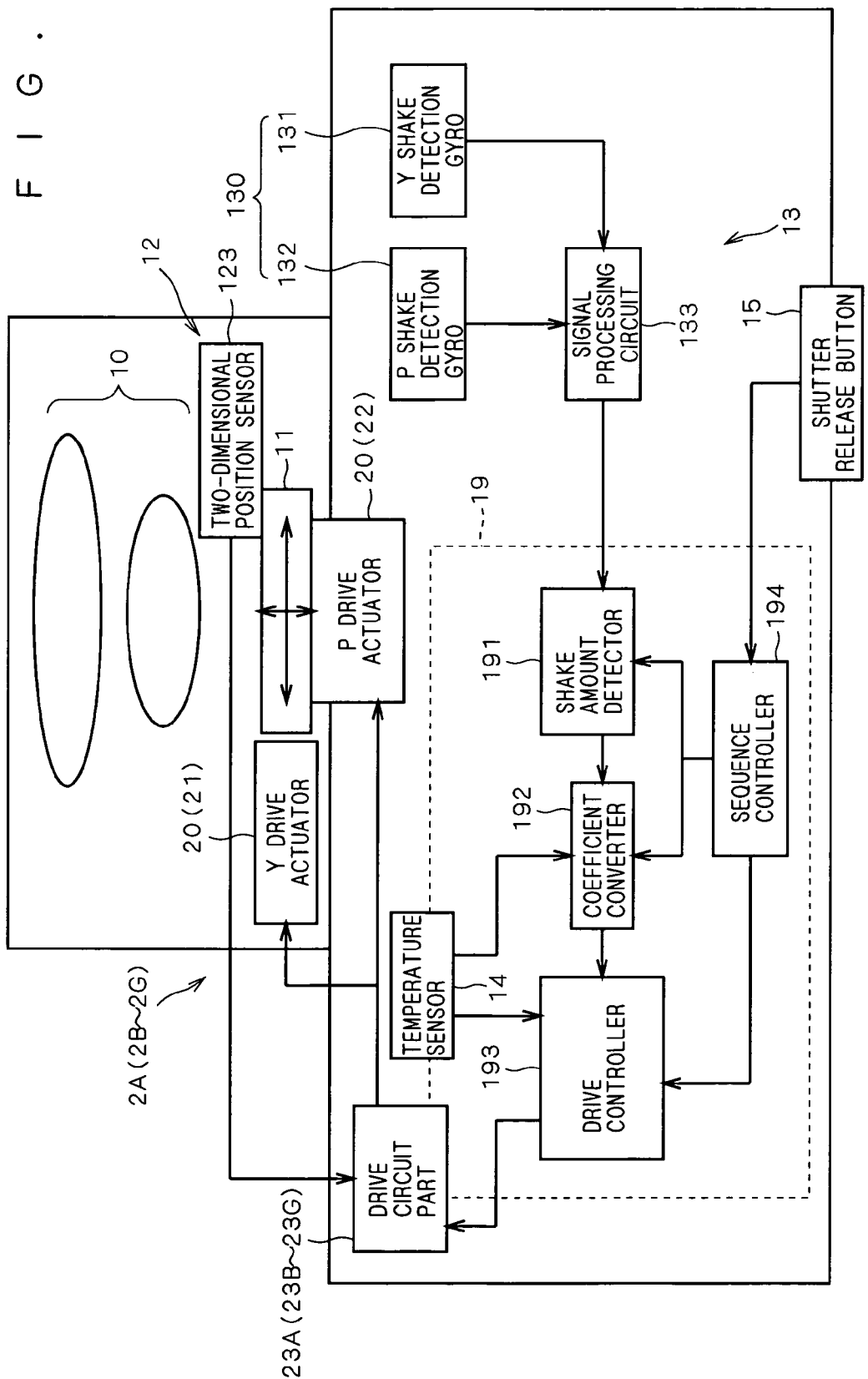

F I G . 1 4
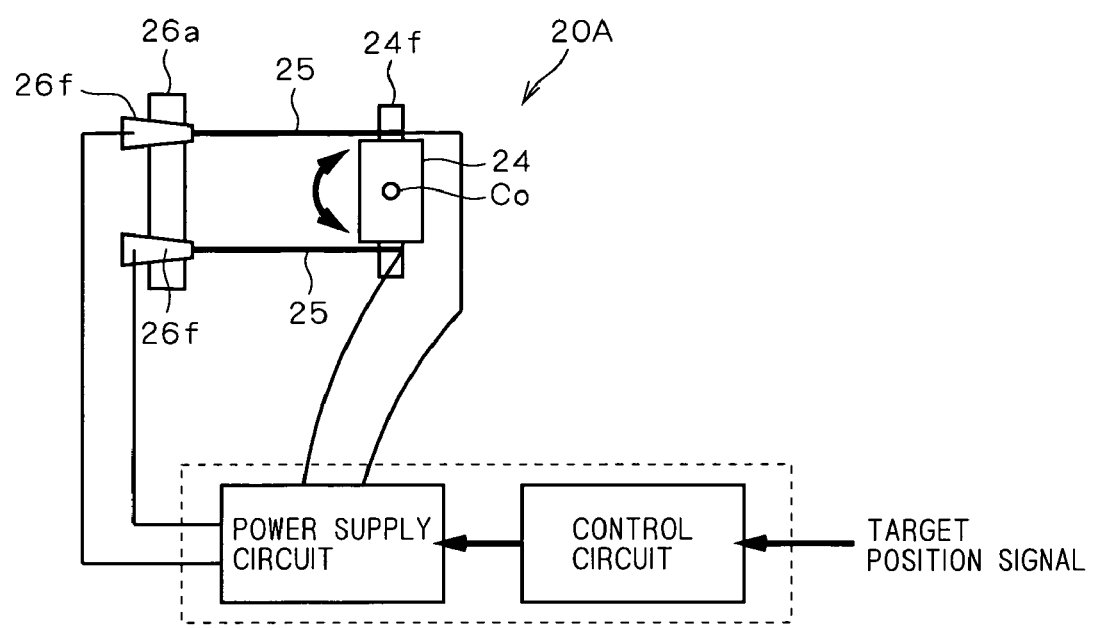

DRIVE APPARATUS, DRIVE SYSTEM, AND DRIVE METHOD

This application is based on application No. 2004-352764 filed in Japan, the contents of which are hereby incorporated by reference.

BACKGROUND OF THE INVENTION

1. Field of the Invention

The present invention relates to a driving technique for driving an actuator having a shape memory alloy and giving a displacement to a movable part on the basis of a displacement target value.

2. Description of the Background Art

A shape memory alloy (hereinafter, also referred to as "SMA") has a property such that even if it is plastic-deformed by an external force at a temperature equal to or less than a martensite transformation start temperature, when heated to a temperature equal to or more than a reverse transformation end temperature, the SMA regains its memorized original shape. There has been known a technique using an SMA having such a property for an actuator.

A technique using the SMA is disclosed in, for example, Japanese Patent Application Laid-Open No. 2003-111458. According to the technique, in two SMAs connected in a push-pull configuration to a movable part which can be moved in the horizontal direction, no current is passed to the SMA that radiates heat and expands, and current is passed only to the SMA to be heated and contracted, thereby driving the movable part.

In the driving technique of Japanese Patent Application Laid-Open No. 2003-111458, however, no current is passed to the SMA on the heat radiation side so that, in some cases, the SMA is cooled excessively. In such a case, to heat the excessively cooled SMA and make it contracted, time to heat the SMA to the reverse transformation start temperature causes a response delay. Consequently, it is difficult to apply the driving technique to a system requiring high response.

SUMMARY OF THE INVENTION

The present invention is directed to a drive apparatus for driving an actuator having two shape memory alloys connected in a push-pull arrangement to a movable part to give a displacement to the movable part on the basis of a displacement target value.

According to the present invention, the drive apparatus includes: (a) feeder that feeds current to a shape memory alloy to be heated on the basis of a drive current signal, thereby making the shape memory alloy perform a regaining operation towards a memorized shape to interlock with the displacement of the movable part; and (b) a controller that generates a first drive current signal based on the displacement target value for one of the two shape memory alloys, which performs the regaining operation, and generates a second drive current signal to which a signal of a bias current is given for another shape memory alloy which does not perform the regaining operation. Consequently, the memory shape alloy on a heat radiation side which does not perform the regaining operation can be set in a pre-heat state, so that higher response can be realized in the actuator.

In a preferred embodiment of the present invention, in the drive apparatus, the bias current is set to a current value necessary to heat the shape memory alloy to a specific temperature in a temperature range from a transformation start temperature to a transformation end temperature of the shape memory alloy, and the controller includes: (b-1) a first generator that generates the first drive current signal by adding a first current signal according to the displacement target value to the signal of the bias current; and (b-2) a second generator that generates the second drive current signal by subtracting a second current signal according to the displacement target value and a heat radiation characteristic of the shape memory alloy from the signal of the bias current. Therefore, drive current signals can be generated properly.

The present invention is also directed to a drive system and a drive method for giving a displacement to a movable part on the basis of a displacement target value.

Therefore, an object of the present invention is to provide a driving technique capable of realizing higher response in an actuator having SMAs in a push-pull arrangement.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a functional configuration of an image capturing apparatus according to a first preferred embodiment of the present invention;

FIG. 14 is a diagram showing the configuration of an actuator according to a modification of the present invention.

DESCRIPTION OF THE PREFERRED EMBODIMENTS

First Preferred Embodiment

Figure 2:
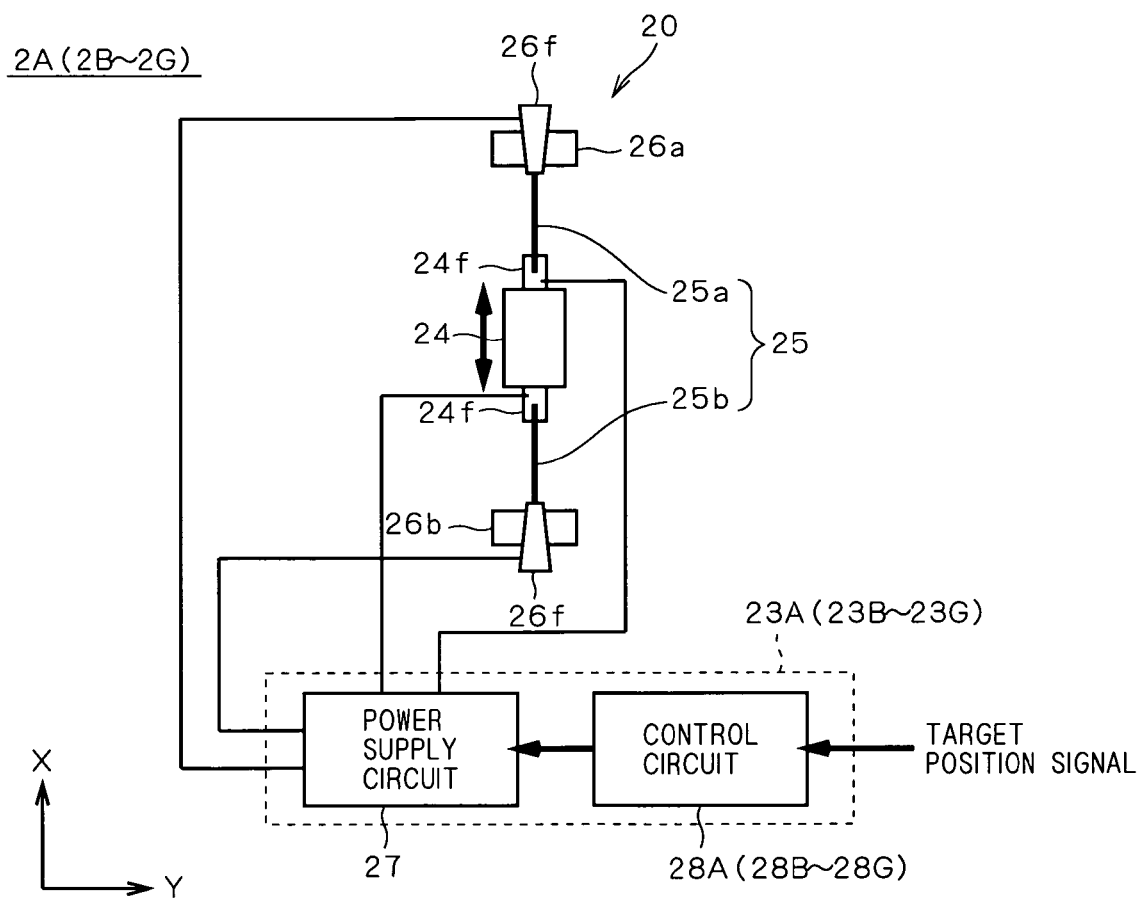
FIG. 2 is a diagram for illustrating the configuration of a drive unit.

Configuration of Main Part of Image Capturing Apparatus

FIG. 1 is a block diagram showing the functional configuration of an image capturing apparatus 1A according to a first preferred embodiment of the present invention.

The image capturing apparatus 1A is constructed as, for example, a digital camera and has a handshake correcting function.

The image capturing apparatus 1A has an image capturing optical system 10, an image sensor 11, and a two-dimensional position sensor 12. In addition, the image capturing apparatus 1A has a drive unit (drive system) 2A for driving the image sensor 11, and a digital controller 19 for controlling the drive unit 2A. The image capturing apparatus 1A has a camera-shake detector 13 that detects a camera shake and outputs a camera-shake signal, a temperature sensor 14 provided in the casing of the image capturing apparatus 1A, and a shutter-release button 15 operated by the user to give an image capture instruction.

The image capturing optical system 10 is constructed by, for example, a plurality of lenses and is a part for forming an image of a subject to be photographed on an image capturing plane of the image sensor 11.

The image sensor 11 is constructed as, for example, a CCD and photoelectrically converts the subject optical image formed by the image capturing optical system 10 to generate an image signal. The image sensor 11 is held by an actuator 20 which will be described later, and can be driven in the horizontal and vertical directions. The position of the image sensor 11 can be detected by the two-dimensional position sensor 12 having a magnet and a two-dimensional Hall device.

The drive unit 2A has two actuators 20 (a Y drive actuator 21 and a P drive actuator 22) that move the image sensor 11, and a drive circuit unit (drive apparatus) 23A for driving the actuators 20.

The Y drive actuator 21 is constructed as an actuator having a shape memory alloy (SMA) and drives the image sensor 11 in the yaw direction.

The P drive actuator 22 is also constructed as an actuator having an SMA and drives the image sensor 11 in the pitch direction.

A drive circuit part 23A supplies drive power to the actuator 20 on the basis of a control signal from the digital controller 19 (which will be described in detail later). The Y drive actuator 21 and the P drive actuator 22 are driven according to a shake of the image capturing apparatus 1A detected by the camera-shake detector 13 and the image sensor 11 is moved by the drive circuit part 23A, thereby enabling an image formation position of a subject optical image to be shifted. Consequently, the shake correction of the image capturing apparatus 1A can be performed.

The camera-shake detector 13 has two gyros 130 (a Y shake detection gyro 131 and a P shake detection gyro 132) for detecting a shake of the image capturing apparatus 1A, and a signal processing circuit 133 for processing signals from the gyros 130.

The Y shake detection gyro 131 is constructed as a gyro sensor capable of detecting a shake, detects a rotation shake that occurs when the image capturing apparatus 1A rotates in the yaw direction (horizontal direction) by a camera shake, and outputs an angular speed signal.

The P shake detection gyro 132 is also constructed as a gyro sensor capable of detecting a shake, detects a rotation shake that occurs when the image capturing apparatus 1A rotates in the pitch direction (vertical direction) by a camera shake, and outputs an angular speed signal.

The signal processing circuit 133 is a part for amplifying the angular speed signals mainly output from the gyros 130.

The temperature sensor 14 is provided to correct a change in performance caused by a temperature change in a specific part of the image capturing apparatus 1A. Concretely, the temperature sensor 14 corrects the two-dimensional position sensor 12 and corrects the drive frequency, drive voltage, and the like of the Y drive actuator 21 and the P drive actuator 22 as necessary, so that an optimum camera-shake correction can be made.

The digital controller 19 is a part having, for example, a CPU and a memory and controlling the components of the image capturing apparatus 1A in a centralized manner. The digital controller 19 has a shake amount detector 191 for detecting a shake on the basis of an output signal from the signal processing circuit 133, a coefficient converter 192, a drive controller 193, and a sequence controller 194.

The shake amount detector 191 performs an integrating process of receiving a rotation shake (angular speed) in each of the Y and P directions of the image capturing apparatus 1A output from the signal processing circuit 133 at predetermined time intervals and converting the angular speed signal to an angle signal. As a result, a shake amount "dety" in the yaw direction and a shake amount "detp" in the pitch direction in the image capturing apparatus 1A are calculated.

The coefficient converter 192 is a part for converting the shake amounts dety and detp detected by the shake amount detector 191 into movement amounts "py" and "pp", respectively.

The drive controller 193 is a part for transmitting a control signal to the drive circuit part 23A on the basis of the movement amounts py and pp output from the coefficient converter 192. In the drive controller 193, by calculating an optimum control value and executing a feedback control, the high-performance drive of the image sensor 11 can be realized.

The sequence controller 194 controls a sequence of image capturing and camera-shake correction of the image capturing apparatus 1A. For example, in the image capturing control, when the shutter-release button 15 is half-pressed by the user (S1 "on"), the sequence controller 194 performs an image capturing preparing operation such as metering and range operation. When the shutter-release button 15 is depressed (S2 "on"), the sequence controller 194 enters an image capturing state. In the case where a camera-shake correction mode is set at the time of the image capturing, the camera-shake correcting operation is performed. In the camera-shake correcting operation, the sequence is controlled in the following order.

(1) The shake amount detector 191 receives the angular speed signal from the signal processing circuit 133 and detects the shake amounts (dety and detp).

(2) The coefficient converter 192 converts the shake amounts (dety and detp) to the movement amounts (py and pp).

(3) The drive controller 193 converts the movement amounts (py and pp) to optimum drive control amounts.

By performing the above-described processes by the sequence controller 194, proper camera-shake correction can be made.

(Configuration of Drive Unit 2A)

FIG. 2 is a diagram illustrating the configuration of the drive unit 2A. Although the drive unit 2A is provided with two actuators 20 as shown in FIG. 1, only one actuator 20 is shown for convenience.

The actuator 20 has a movable part 24 connected to the image sensor 11, two SMAs 25 (25a and 25b) in wire shape connected in push-pull arrangement to both ends of the movable part 24, and fixed parts 26a and 26b for fixing the ends of the two SMAs 25.

Terminals 24f and 26f for fixing ends of the two SMAs 25 are provided for both ends of the movable part 24 and the fixed parts 26a and 26b. The terminals 24f and 26f are conductive and function as terminals of the case of passing electricity to energize the SMAs 25a and 25b.

The SMA 25 has a resistance value of, for example, 20Ω. When the SMA 25 is energized by the terminals 24f and 26f connected at both ends, Joule heat is generated and the SMA 25 itself is heated. The SMA 25 regains the memorized shape by the heating and can drive the movable part 24 in a predetermined direction (X direction). Each of the SMAs 25 memorizes a predetermined shrinkage amount so that it performs a shrinkage operation when heated by energization. In a neutral state shown in FIG. 2, a proper stress is applied to the SMA 25. The SMA 25 also has a property such that heat rotation speed (temperature drop rate of the SMA 25) from stop of the energization is 1.5 times slower than heating speed (temperature rise rate of the SMA 25) by the energization.

With the configuration of such an actuator 20, when the SMA 25a is energized, the movable part 24 moves in the +X direction. When the SMA 25b is energized, the movable part 24 moves in the −X direction. The properties of the SMA 25 will be described in detail below.

Figure 3:
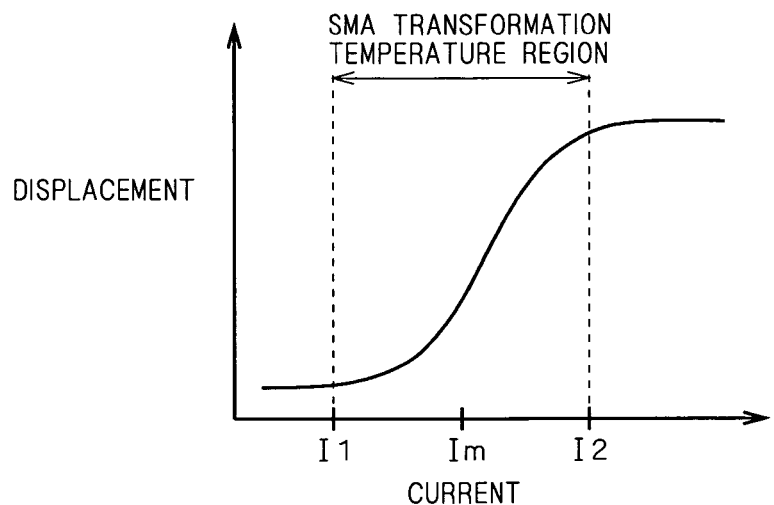
FIG. 3 is a diagram showing the relation between passed current and displacement in an SMA.

FIG. 3 is a diagram showing the relation between passed current and displacement in the SMA 25. In FIG. 3, the horizontal axis indicates current value, and the vertical axis indicates displacement of the SMA 25.

When passed current reaches a current value I1, the SMA 25 starts deforming in the shrinkage direction. When the passed current reaches a current value I2, the deformation is completed. That is, the region from the current value I1 necessary to heat the SMA 25 to austenite transformation start temperature to the current value I2 necessary to heat the SMA 25 to transformation end temperature corresponds to a transformation temperature region in which deformation occurs in the SMA 25.

Figure 4:
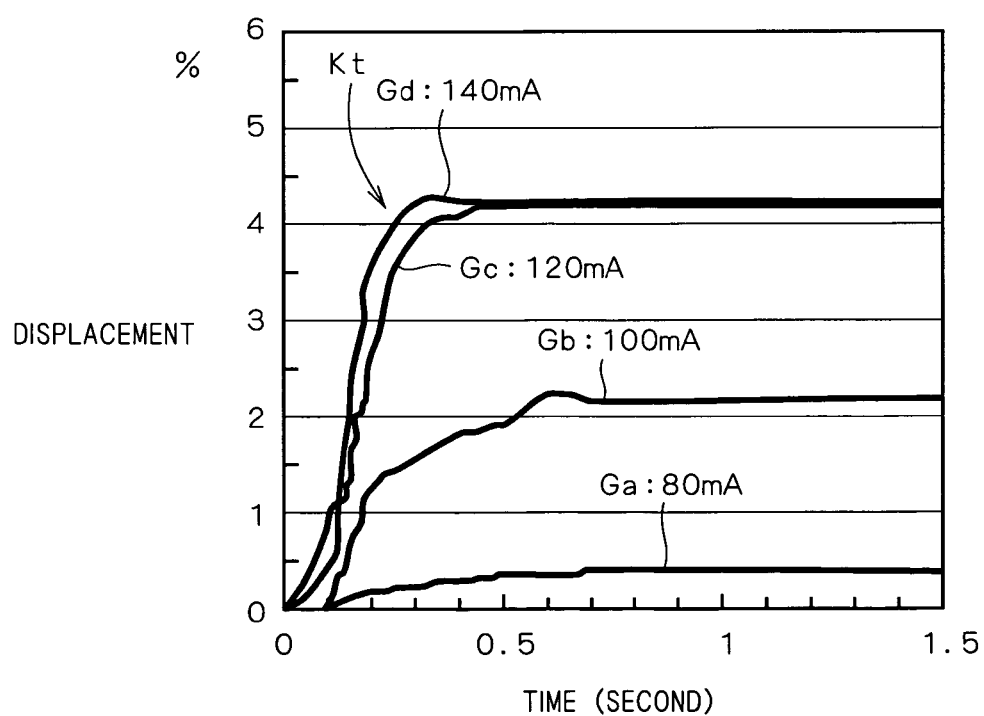
FIG. 4 is a diagram showing results of step response to passage of current to the SMA.

FIG. 4 is a diagram showing the result of step response to the passage of current to the SMA 25. In FIG. 4, the horizontal axis indicates time, and the vertical axis indicates displacement (%) of the SMA 25.

In the SMA 25, in the case of passing current step by step like 80 mA, 100 mA, 120 mA, and 140 mA, displacement changes with lapse of time as shown by lines Ga, Gb, Gc, and Gd, respectively.

As shown by the lines Gc and Gd, in both of the case of passing 120 mA and the case of passing 140 mA, the displacement is converged to about 4.2%. It can be consequently said that the displacement saturates when current of 120 mA is passed. In this case, response speed corresponding to an inclined portion Kt in the line becomes almost the maximum. In other words, the minimum current value at which the maximum displacement speed in the SMA 25 is 120 mA. When the resistance value of the SMA 25 itself is 20Ω, to pass current of the current value of 120 mA, it is necessary to apply a voltage of 2.4 V (=20Ω×0.12 A).

Referring again to FIG. 2, the description will be continued.

The drive circuit part 23A has a power supply circuit 27 for supplying power by applying voltage to each of the SMAs 25, and a control circuit 28A for sending a drive control signal to the power supply circuit 27.

The power supply circuit 27 is constructed as, for example, a power amplifier and applies a voltage based on the drive control signal from the control circuit 28A to the SMA 25. Specifically, the power supply circuit 27 feeds current to the SMA 25 on the basis of the drive control signal (drive current signal) sent from the control circuit 28A to heat the SMA 25, so that the operation of regaining the memorized shape of the SMA 25 interlocked with displacement of the movable part 24 can be performed. The power supply circuit 27 is not limited to a power amplifier but may be constructed as an H bridge driver with a constant voltage control function.

The control circuit 28A computes voltage and current applied to the SMA 25, necessary to drive the movable part 24 to a target position on the basis of the target position signal input from the digital controller 19, and outputs the result of computation as a drive control signal to the power supply circuit 27.

The drive unit 2A having such a configuration realizes higher response. The operation of the drive unit 2A will be described below.

(Operation of Drive Unit 2A)

Figure 5A:
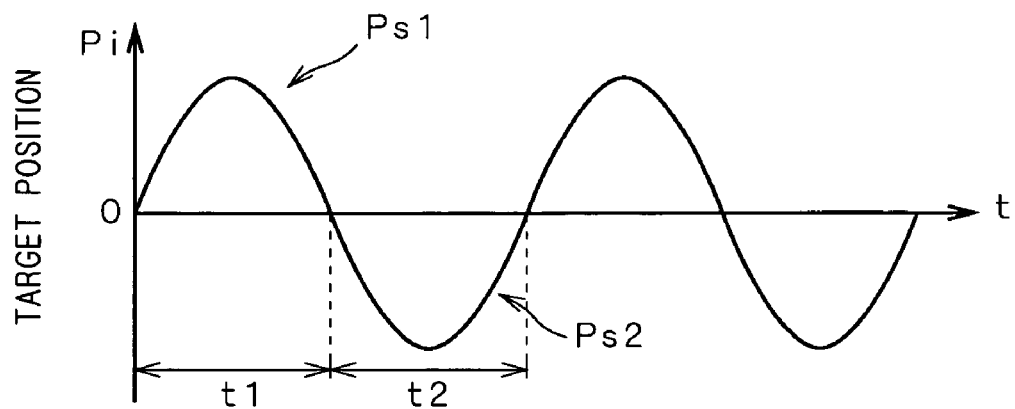
FIGS. 5A and 5B are diagrams for illustrating operation of the drive unit.
Figure 5B:
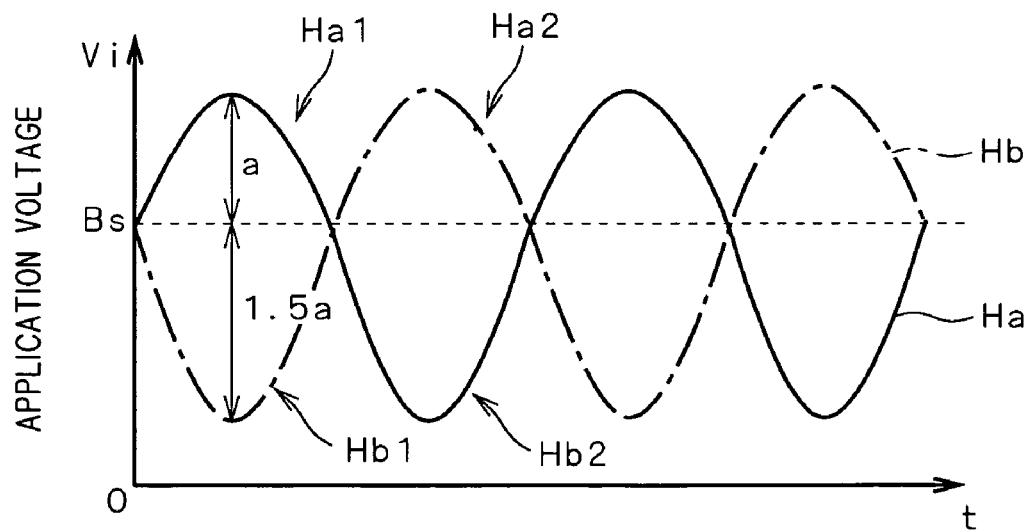

FIGS. 5A and 5B are diagrams showing the operation of the drive unit 2A. FIG. 5A shows the signal waveform in a target position, and FIG. 5B shows signal waveforms Ha and Hb of voltages applied to the SMAs 25a and 25b, respectively. The vertical axis of FIG. 5A shows an amount of movement (displacement amount) in the +X direction when the neutral position of the movable part 24 shown in FIG. 2 is set as Pi=0.

In case where a target position signal (signal of a displacement target value) having a sine wave shape shown in FIG. 5A is input from the digital controller 19, the control circuit 28A of the drive unit 2A generates a drive control signal to apply a voltage having the waveform Ha as shown in FIG. 5B to the SMA 25a and a drive control signal to apply a voltage having the waveform Hb as shown in FIG. 5B to the SMA 25b. The characteristics of the signal waveforms Ha and Hb will be described below.

Signals having the signal waveforms Ha and Hb are analog signals oscillated in accordance with the target position signal shown in FIG. 5A by using a bias voltage Bs as a reference which is a predetermined DC voltage necessary to pass a current having a value in the SMA transformation temperature region shown in FIG. 3. The bias current value in this preferred embodiment is set to a current value necessary to increase the temperature to a specific temperature in the temperature range from the transformation start temperature of the SMA 25 to the transformation end temperature. For example, a current value Im as a mean value of the upper-limit and lower-limit current values I1 and I2 of the SMA transformation temperature region shown in FIG. 3 is set. It is preferable to set the bias current to a current value necessary to increase the temperature to a specific temperature which is equal to or less than the mean value of the transformation start temperature and the transformation end temperature of the SMA, that is, to a current value in the range from the lower limit value I1 to the mean value Im in the SMA transformation temperature region of FIG. 3 in consideration of the case such that the movable part 24 oscillates with flucturing waves.

In the case where a signal having the signal waveform Ps1 which makes the movable part 24 move in the +X direction (refer to FIG. 2) in a time zone t1 (FIG. 5A) is input, for the SMA 25a that has to shrinkage, the control circuit 28A outputs a drive control signal obtained by adding a voltage value proportional to the signal waveform Ps1 like a signal waveform Ha1 shown in FIG. 5B to the bias voltage Bs to the power supply circuit 27. To improve the response speed of the SMA 25a, the peak voltage value having the signal waveform Ha1 is set to a voltage (for example, 2.4 V) corresponding to the current value 120 mA (refer to FIG. 4) at which the response speed of the SMA almost saturates.

On the other hand, for the SMA 25b which does not have to shrinkage and is expanded, heat radiation speed of the SMA is lower than the heating speed by 1.5 times as described above. Consequently, as shown by a signal waveform Hb1 in FIG. 5B, a voltage value 1.5a which is 1.5 times as large as the voltage value "a" added to the bias voltage Bs with the signal waveform Ha1 is subtracted from the bias voltage Bs in the time zone t1.

As described above, the control circuit 28A generates the signal waveform Ha1 of an applied voltage corresponding to a drive current signal obtained by adding a current signal proportional to the displacement target value to the signal of bias current for the SMA 25a performing the regaining operation, and generates the signal waveform Hb1 of an applied voltage corresponding to a drive current signal obtained by subtracting a current signal according to the displacement target value and the heat radiation characteristic from the signal of bias current for the other SMA 25b which does not perform regaining operation.

That is, the control circuit 28A supplies the signal of the bias voltage Bs necessary to pass a specific current value in the SMA transformation temperature region as a drive current signal of each SMA 25 and determines a voltage to be applied to the SMA 25b in consideration of the heat radiation characteristic of the SMA 25. Consequently, heat radiation of the SMA 25b to be expanded is minimized and a preheat state for the next expanding/contracting operation can be held. As a result, the SMA 25b to be expanded is not excessively cooled. In the case of heating the SMA 25b next, for example, even when the signal waveform Ps2 by which the SMA 25b is heated and contracted in a time zone t2 as shown in FIG. 5A is input, a time lag in heating can be reduced, and a response delay can be decreased.

In the case where the signal waveform Ps2 which makes the movable part 24 move in the –X direction (refer to FIG. 2) is input to the control circuit 28A in the time zone t2 as shown in FIG. 5A, the drive control signal having the signal waveform Ha2 is generated for the SMA 25b to be contracted, and the drive control signal having an amplitude which is 1.5 times as large as the signal waveform Ha1 is generated as shown by the signal waveform Hb2 for the SMA 25a to be expanded.

By the operation of the drive unit 2A as described above, the SMA on the heat radiation side is prevented from being excessively cooled by passing the bias current, so that the drive unit 2A can promptly deal with the case where heating is necessary, and the response of the actuator can be increased. Further, since the current to be passed (voltage to be applied) is determined in consideration of the heat radiation characteristic of the SMA, a proper pre-heat state can be realized.

Second Preferred Embodiment

An image capturing apparatus 1B according to a second preferred embodiment of the present invention has a configuration similar to that of the image capturing apparatus 1A of the first preferred embodiment shown in FIGS. 1 and 2 except for the configuration of the drive unit.

Specifically, a drive unit 2B of the second preferred embodiment has a control circuit 28B capable of performing the following operation.

(Operation of Drive Unit 2B)

Figure 6A:
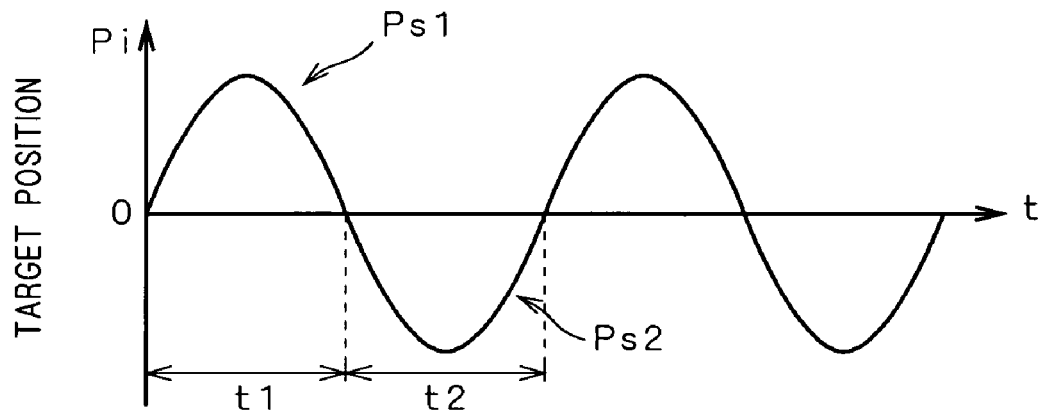
FIGS. 6A and 6B are diagrams for illustrating operation of a drive unit according to a second preferred embodiment of the present invention.
Figure 6B:
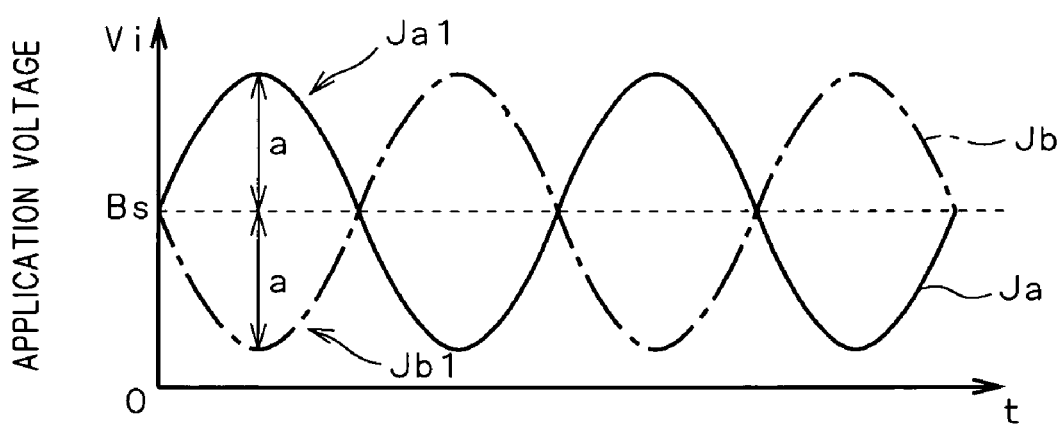

FIGS. 6A and 6B are diagrams illustrating the operation of the drive unit 2B. FIG. 6A shows the signal waveform in a target position, and FIG. 6B shows signal waveforms Ja and Jb of voltages applied to the SMAs 25a and 25b, respectively.

The SMA 25 of the first preferred embodiment has a characteristic that the heat radiation speed is lower than the heating speed by 1.5 times. In the SMA 25 of this preferred embodiment, however, the heat radiation speed is almost equal to the heating speed.

The control circuit 28B of the second preferred embodiment generates a drive control signal obtained by adding a voltage value proportional to the signal waveform Ps1 of FIG. 6A like a signal waveform Ja1 shown in the time zone t1 in FIG. 6B to the bias voltage Bs and outputs it to the power supply circuit 27 for the SMA 25a in a manner similar to the first preferred embodiment. On the other hand, different from the first preferred embodiment, since the heat dissipation speed of the SMA is equal to the heating speed, the control circuit 28B generates a drive control signal obtained by subtracting a voltage value equal to the added voltage value to form the signal waveform Ja1 from the bias voltage Bs like a signal waveform Jb1 (FIG. 6B) in the time zone t1 for the SMA 25b, and outputs it to the power supply circuit 27. That is, the control circuit 28B generates the signal waveform Ja1 of the applied voltage corresponding to the drive current signal obtained by adding a current signal (first current signal) according to the displacement target value to the signal of the bias current for the SMA 25a performing the regaining operation, and generates the signal waveform Jb1 of the applied voltage corresponding to the drive current signal obtained by subtracting the first current signal from the signal of the bias current for the other SMA 25b which does not perform the regaining operation.

As described above, in the control circuit 28B, the bias voltage Bs necessary to pass current having a specific current value in the SMA transformation temperature region is given to the drive control signal of each SMA 25, and a voltage applied to the SMA 25b is determined in consideration of the heating/radiating characteristics of the SMA 25. Thus, heat radiation of the SMA 25b is suppressed to the minimum, and a preheat state for the next expanding/contracting operation can be held. As a result, even when the signal waveform Ps2 by which the SMA 25b is heated and contracted in a time zone t2 as shown in FIG. 6A is input, a time lag in heating can be reduced.

By the operation of the drive unit 2B as described above, the SMA on the heat radiation side is prevented from being excessively cooled by supplying an applied voltage obtained by using the bias current as a reference to the SMA on the heat radiation side, the response of the actuator can be increased.

Third Preferred Embodiment

An image capturing apparatus 1C according to a third preferred embodiment of the present invention has a configuration similar to that of the image capturing apparatus 1A of the first preferred embodiment shown in FIGS. 1 and 2 except for the configuration of the drive unit.

Specifically, a drive unit 2C of the third preferred embodiment has a control circuit 28C capable of performing the following operation.

(Operation of Drive Unit 2C)

Figure 7A:
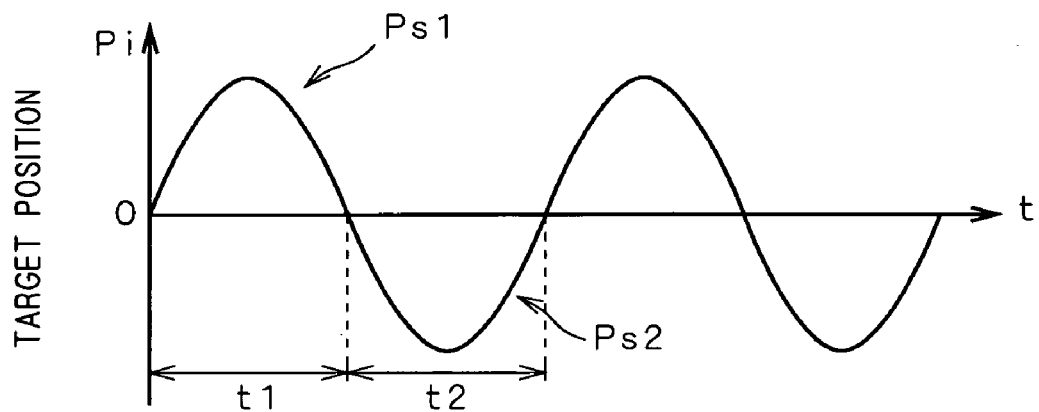
FIGS. 7A and 7B are diagrams for illustrating operation of a drive unit according to a third preferred embodiment of the present invention.
Figure 7B:
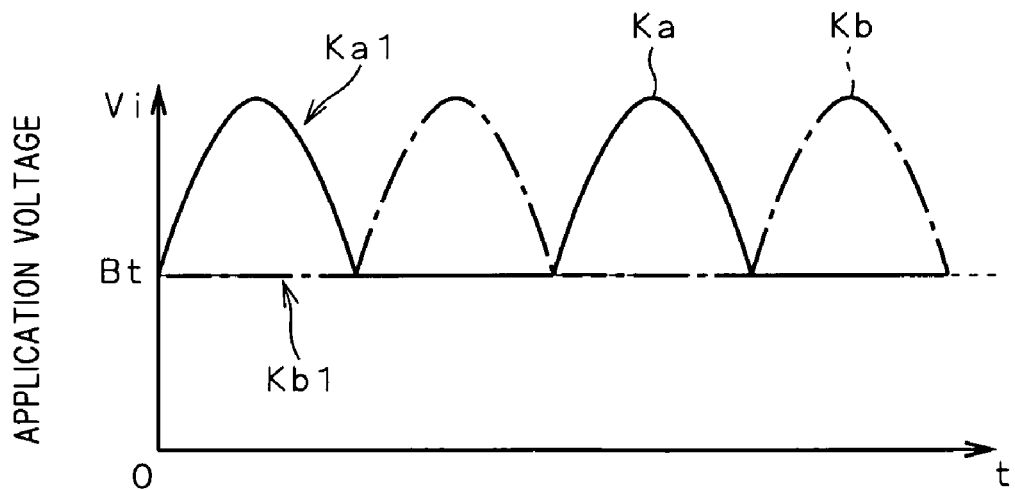

FIGS. 7A and 7B are diagrams illustrating the operation of the drive unit 2C. FIG. 7A shows the signal waveform in a target position, and FIG. 7B shows signal waveforms Ka and Kb of voltages applied to the SMAs 25a and 25b, respectively.

A bias voltage Bt in the signal waveforms Ka and Kb is set to an applied voltage necessary to pass current having the current value I1 as the lower limit of the SMA transformation temperature region shown in FIG. 3. That is, the bias current of this preferred embodiment is set to a current value necessary to increase the temperature to austenite transformation start temperature of the SMA 25.

The control circuit 28C of the third preferred embodiment generates a drive control signal obtained by adding a voltage value proportional to the signal waveform Ps1 of FIG. 7A like a signal waveform Kb1 shown in the time zone t1 in FIG. 7B to the bias voltage Bt and outputs it to the power supply circuit 27 for the SMA 25a in a manner similar to the first preferred embodiment. On the other hand, the control circuit 28C outputs a drive control signal fixed to the bias voltage Bt like the signal waveform Kb1 shown in FIG. 7B to the power supply circuit 27 for the SMA 25b.

As described above, the control circuit 28C generates the signal waveform Ka1 of the applied voltage corresponding to the drive current signal obtained by adding a current signal according to the displacement target value to the signal of the bias current for the SMA 25a performing the regaining operation, and generates the signal waveform Kb1 of the applied voltage corresponding to the signal of the bias current as the drive current signal of the other SMA 25b which does not perform the regaining operation.

In the control circuit 28C, the bias voltage Bt necessary to pass current with the current value I1 as the lower limit of the SMA transformation temperature region is given to the drive control signal of each SMA 25 and the predetermined bias voltage Bt is applied to the SMA 25b on the heat radiation side. Consequently, heat radiation of the SMA 25b is suppressed to the minimum, and a preheat state prepared for the next expanding/contracting operation can be maintained. As a result, even when the signal waveform Ps2 by which the SMA 25b is heated and contracted in the time zone t2 as shown in FIG. 7A is input, a time lag in heating can be reduced.

By the operation of the drive unit 2C as described above, the SMA on the heat radiation side is prevented from being excessively cooled by applying only the bias voltage corresponding to the current value of the lower limit of the transformation temperature region, the response of the actuator can be increased.

Fourth Preferred Embodiment

An image capturing apparatus 1D according to a fourth preferred embodiment of the present invention has a configuration similar to that of the image capturing apparatus 1B of the second preferred embodiment shown in FIGS. 1 and 2 except for the configuration of the drive unit.

A drive unit 2D of the fourth preferred embodiment has a control circuit 28D capable of performing the following operation.

(Operation of Drive Unit 2D)

Figure 8A:
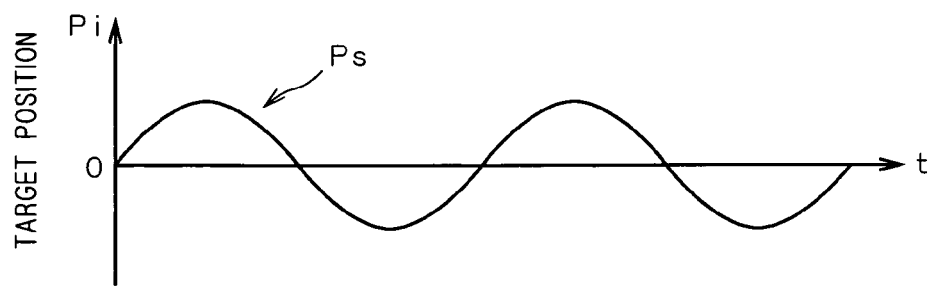
FIGS. 8A to 8D are diagrams for illustrating operation of a drive unit according to a fourth preferred embodiment of the present invention.
Figure 8B:
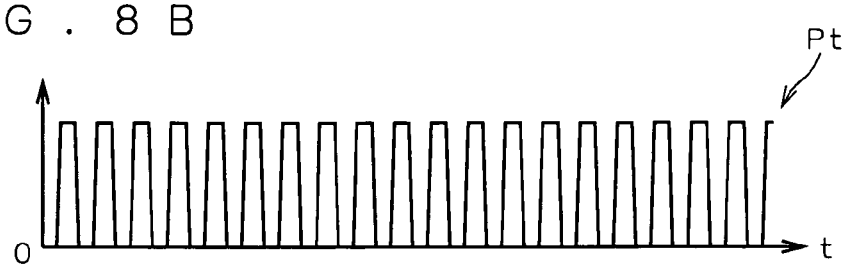
Figure 8C:
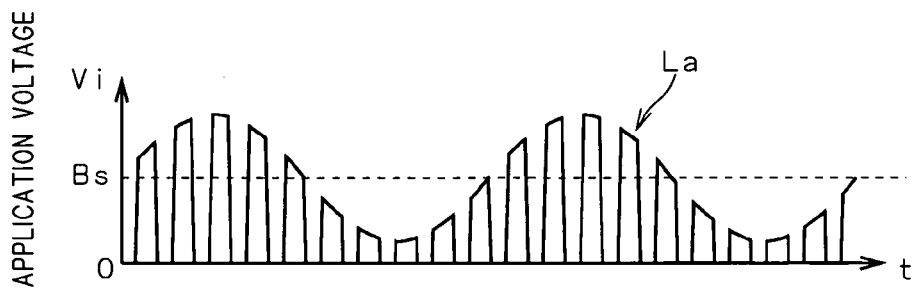
Figure 8D:
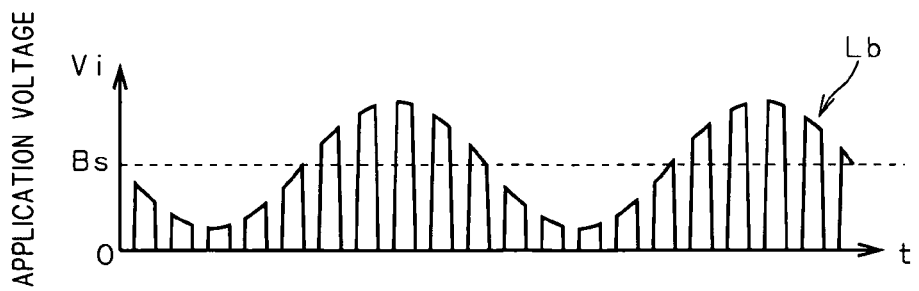

FIGS. 8A to 8D are diagrams illustrating operation of the drive unit 2D. FIG. 8A shows a signal waveform in the target position. FIG. 8B shows a pulse signal Pt. FIGS. 8C and 8D show signal waveforms La and Lb of voltages applied to the SMAs 25a and 25b, respectively.

In the drive unit 2D of the fourth preferred embodiment, a signal decimation process on the signal waveforms Ja and Jb of the second preferred embodiment shown in FIG. 6B is performed in the control circuit 28D. The signal decimation process will be described concretely.

The control circuit 28D generates the signal waveforms Ja and Jb to be applied to the SMAs 25 as shown in FIG. 6B in a manner similar to the second preferred embodiment on the basis of the target position signal Ps shown in FIG. 8A.

By performing a process of overlapping the signal waveforms Ja and Jb with the pulse signals Pt (FIG. 8B) as decimation signals generated in the control circuit 28D, the drive waveform La of the SMA 25a shown in FIG. 8C and the drive waveform Lb of the SMA 25b shown in FIG. 8D are generated. The pulse signal Pt has a frequency at which the SMA 25 does not react (respond), for example, 1 Hz or more.

Since the voltages are applied to the SMAs 25a and 25b on the basis of the signal waveforms La and Lb subjected to the signal decimation process by using the pulse signal Pt, power according to the ratio (duty ratio) between on time and off time of the pulse signal Pt can be reduced. When the duty ratio corresponding to the signal decimation ratio becomes low, power to displace the SMA 25 to a target position cannot be supplied and performance deteriorates. Consequently, the duty ratio is set so that the average value of the passed current per unit time lies in the SMA transformation temperature region shown in FIG. 3.

By the operation of the drive unit 2D as described above, effects similar to those of the second preferred embodiment are produced. Further, the drive current signals of the SMA are decimated, so that power can be saved.

The signal decimation process in the drive unit 2D of the fourth preferred embodiment may be applied to the drive waveforms Ha1 and Hb1 in the first preferred embodiment shown in FIG. 5B and the drive waveforms Ka1 and Kb1 of the third preferred embodiment shown in FIG. 7B.

Fifth Preferred Embodiment

An image capturing apparatus 1E according to a fifth preferred embodiment of the present invention has a configuration similar to that of the image capturing apparatus 1B of the second preferred embodiment shown in FIGS. 1 and 2 except for the configuration of the drive unit.

A drive unit 2E of the fifth preferred embodiment has a control circuit 28E capable of performing the following operation.

(Operation of Drive Unit 2E)

Figure 9A:
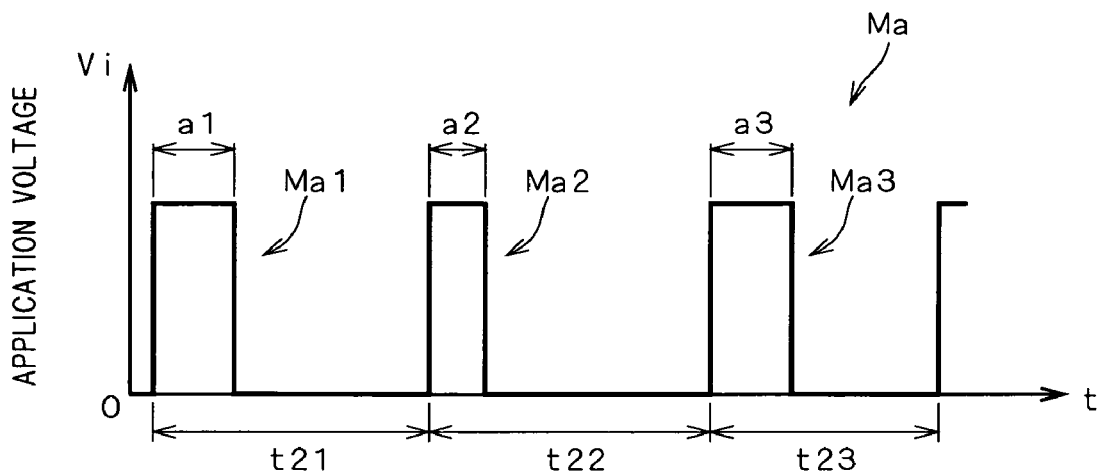
FIGS. 9A and 9B are diagrams for illustrating operation of a drive unit according to a fifth preferred embodiment of the present invention.
Figure 9B:
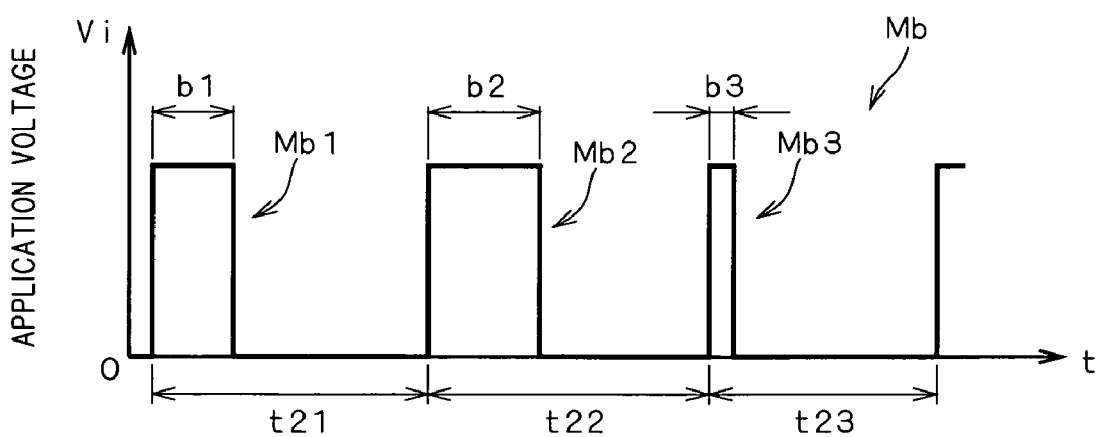

FIGS. 9A and 9B are diagrams showing operation of the drive unit 2E. FIGS. 9A and 9B show signal waveforms Ma and Mb of voltages applied to the SMAs 25a and 25b, respectively.

In the control circuit 28E of the fifth preferred embodiment, a voltage is applied to the SMA 25 on the basis of a pulse signal (PWM pulse). Since the average value of the voltage in the pulse signal corresponds to the power to the SMA 25, by adjusting the duty ratio of pulse signals to the SMAs 25a and 25b, a heating amount, that is, a displacement amount can be controlled. By setting the carrier frequency of the pulse signal to a frequency (for example, 1 kHz or more) sufficiently high with respect to the response of the SMA 25, the influence of a drive error caused due to the fact that the response of the SMA 25 follows the pulse signal itself can be suppressed to an ignorable level. In order to improve the response speed of the SMA 25, a peak voltage value when the pulse signal is on is set equal to or more than a voltage (for example, 2.4 V) corresponding to a current value 120 mA (refer to FIG. 4) at which the response speed of the SMA almost saturates.

By such a PWM control as well, the performance equivalent to that of the analog voltage control described in the first to third preferred embodiments can be realized in the drive unit 2E. The PWM control corresponding to the analog voltage control of the second preferred embodiment will be concretely described below.

In the time zone t21 shown in FIGS. 9A and 9B, signal waveforms Ma1 and Mb1 corresponding to the bias voltage Bs in FIG. 6B are generated by the control circuit 28E. The average voltage per unit time of the signal waveforms Ma1 and Mb1 corresponds to the bias voltage Bs, and signals having the signal waveforms Ma1 and Mb1 are pulse signals having the duty ratio a1/t21 (=b2/t21).

By applying the pulse signals Ma1 and Mb1 having the duty ratio corresponding to the bias voltage Bs to the SMAs 25a and 25b, a displacement of the target position Pi=0 of FIG. 6A is given to the movable part 24.

In order to drive the movable part 24 in the −X direction (FIG. 2), signal waveforms Ma2 and Mb2 shown in a time zone t22 are generated by the control circuit 28E. Specifically, for a duty ratio b2/t22 of the signal waveform Mb2 for the SMA 25b, a duty ratio according to a target position in the −X direction is added to the duty ratio b1/t21 as a reference in the signal waveform Mb1. On the other hand, for a duty ratio a2/t22 of the signal waveform Ma2 to the SMA 25a, a duty ratio is set by decreasing voltage-on-time a2 so that a2=b1−b2+a1 is satisfied.

By repeating application of voltages based on the signal waveforms Ma2 and Mb2 to the SMAs 25a and 25b, the contracting operation of the SMA 25b is continuously performed, the SMA 25a expands, and the movable part 24 moves like, for example, the target position signal Ps2 shown in FIG. 6.

As described above, in the control circuit 28E, the signal waveform Mb2 of an applied voltage corresponding to a pulse width modulation signal obtained by adding the duty ratio (first duty ratio) according to the displacement target value to the reference duty ratio b1/t21 (=a1/t21) is generated for the SMA 25b performing the regaining operation, and the signal waveform Hb1 of an applied voltage corresponding to a pulse width modulation signal obtained by subtracting the first duty ratio from the reference duty ratio is generated for the other SMA 25a which does not perform the regaining operation.

On the other hand, in order to drive the movable part 24 in the +X direction (FIG. 2), signal waveforms Ma3 and Mb3 shown in a time zone t23 are generated by the control circuit 28E. Specifically, for a duty ratio a3/t23 of the signal waveform Ma3 for the SMA 25a, a duty ratio according to a target position in the +X direction is added to the duty ratio a1/t21 of the signal waveform Ma1. For a duty ratio b3/t23 of the signal waveform Mb3 to the SMA 25b, a duty ratio is set by decreasing voltage-on-time b3 so that b3=a1−a3+b1 is satisfied.

By repeating application of voltages based on the signal waveforms Ma3 and Mb3 to the SMAs 25a and 25b, the contracting operation of the SMA 25a is continuously performed, the SMA 25b expands, and the movable part 24 moves like, for example, the target position signal Ps1 shown in FIG. 6.

By the operation of the drive unit 2E as described above, voltages are applied to the SMAs on the heating side and the heat radiation side on the basis of the pulse signals having the duty ratio centered on that of the pulse signal corresponding to the bias voltage, so that the SMA on the heat radiation side is not cooled excessively. Thus, the response of the actuator can be improved.

Sixth Preferred Embodiment

An image capturing apparatus 1F according to a sixth preferred embodiment of the present invention has a configuration similar to that of the image capturing apparatus 1E of the fifth preferred embodiment shown in FIGS. 1 and 2 except for the configuration of the drive unit.

A drive unit 2F of the sixth preferred embodiment has a control circuit 28F capable of performing the following operation.

(Operation of Drive Unit 2F)

Figure 10A:
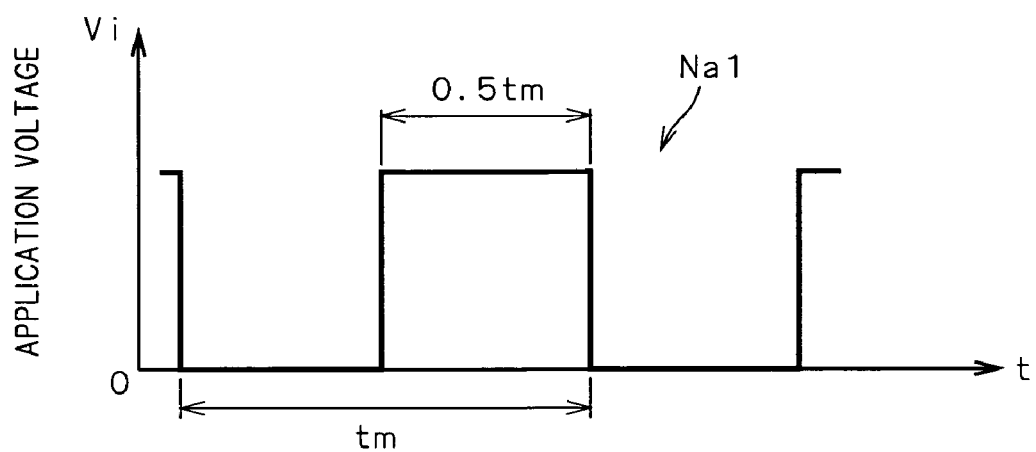
FIGS. 10A, 10B, 11A and 11B are diagrams for illustrating operation of a drive unit according to a sixth preferred embodiment of the present invention.
Figure 10B:
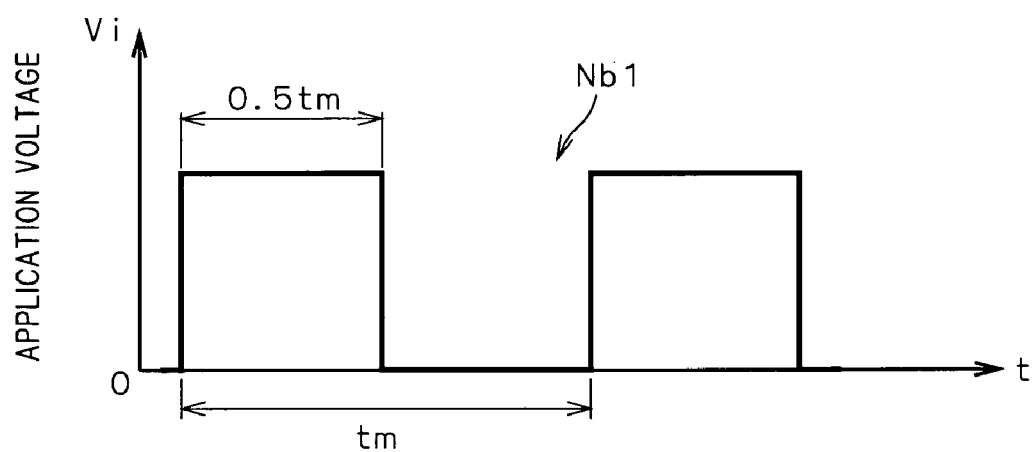
Figure 11A:
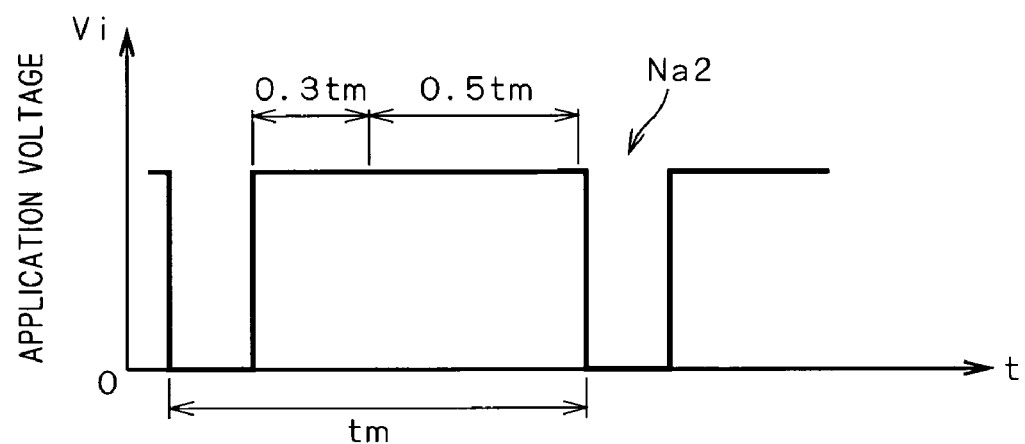
Figure 11B:
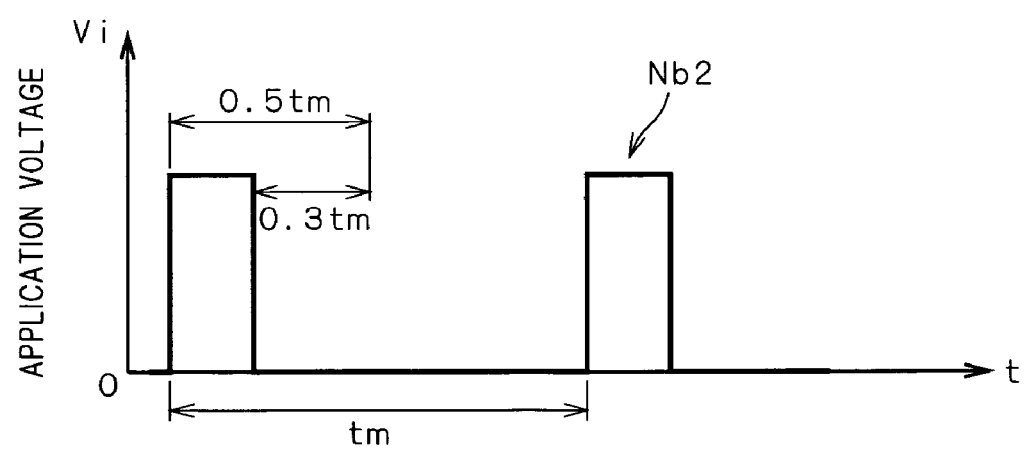

FIGS. 10A, 10B, 11A and 11B are diagrams illustrating the operation of the drive unit 2F. FIGS. 10A and 11A show signal waveforms Na1 and Na2 of voltages applied to the SMA 25a, and FIGS. 10B and 11B show signal waveforms Nb1 and Nb2 of voltages applied to the SMA 25b.

In the control circuit 28F of the drive unit 2F, a voltage is applied to the SMA 25 on the basis of a pulse signal (PWM pulse) in a manner similar to the fifth preferred embodiment, and the signal waveforms Na1 and Nb1 shown in FIGS. 10A and 10B are set as pulse signals corresponding to the bias voltage Bs (FIG. 6B). Signals having the signal waveforms Na1 and Nb1 are generated as pulse signals obtained by setting the reference duty ratio in the signal waveforms Ma1 and Mb1 in the fifth preferred embodiment shown in FIGS. 9A and 9B to 50% and are complementary signals such that when one of the signals is on, the other signal is off. Concretely, as shown in FIGS. 10A and 10B, the on time of the signal waveforms Na1 and Nb1 is set to 0.5 tm which is the half of one pulse cycle "tm" of the waveform signals Na1 and Nb1. By setting the carrier frequency of the pulse signal to a frequency (for example, 1 kHz or more) sufficiently high with respect to the response of the SMA 25, the influence of a drive error caused due to the fact that the response of the SMA 25 follows the pulse signal itself can be suppressed to an ignorable level. In order to improve the response speed of the SMA 25, the voltage value when the pulse signal is on is set equal to or more than a voltage (for example, 2.4 V) corresponding to a current value 120 mA (refer to FIG. 4) at which the response speed of the SMA almost saturates.

To drive the movable part 24 in the +X direction (FIG. 2), the signal waveforms Na2 and Nb2 shown in FIGS. 11A and 11B are generated by the control circuit 28F. The signal waveform Na2 for the SMA 25a and the signal waveform Nb2 for the SMA 25b are set to the duty ratio of 80% obtained by increasing the signal waveform Na1 of the duty ratio of 50% shown in FIG. 10A by 30%, and the duty ratio of 20% obtained by decreasing the signal waveform Nb1 of the duty ratio of 50% shown in FIG. 10B by 30%, and the signal waveforms Na2 and Nb2 have a complementary relation.

By repeating application of voltages based on the signal waveforms Na2 and Nb2 to the SMAs 25a and 25b, the contracting operation of the SMA 25a is continuously performed, the SMA 25b expands, and the movable part 24 moves like, for example, the target position signal Ps1 shown in FIG. 6A.

In order to drive the movable part 24 in the −X direction (FIG. 2), for example, it is sufficient to set the signal waveform Nb2 in FIG. 11B as the drive waveform of the SMA 25a, and set the signal waveform Na2 in FIG. 11A as the drive waveform of the SMA 25b.

By the operation of the drive unit 2F as described above, effects similar to those of the fifth preferred embodiment are produced. Further, since complementary drive waveforms are applied to the SMAs, the configuration of the drive control can be simplified.

Seventh Preferred Embodiment

An image capturing apparatus 1G according to a seventh preferred embodiment of the present invention has a configuration similar to that of the image capturing apparatus 1F of the sixth preferred embodiment shown in FIGS. 1 and 2 except for the configuration of the drive unit.

A drive unit 2G of the seventh preferred embodiment has a control circuit 28G capable of performing the following operation.

(Operation of Drive Unit 2G)

Figure 12A:
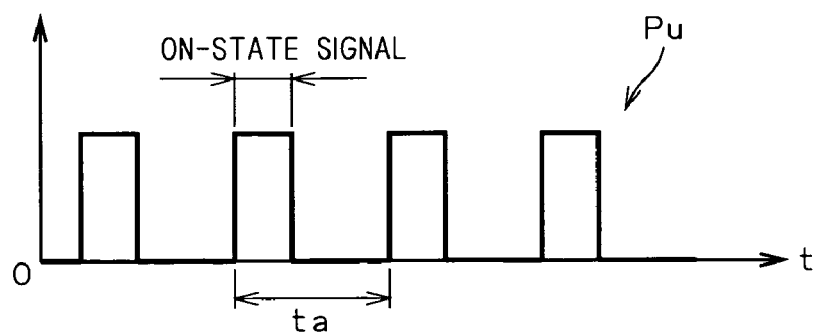
FIGS. 12A to 12C and 13A to 13C are diagrams for illustrating operation of a drive unit according to a seventh preferred embodiment of the present invention.
Figure 12B:
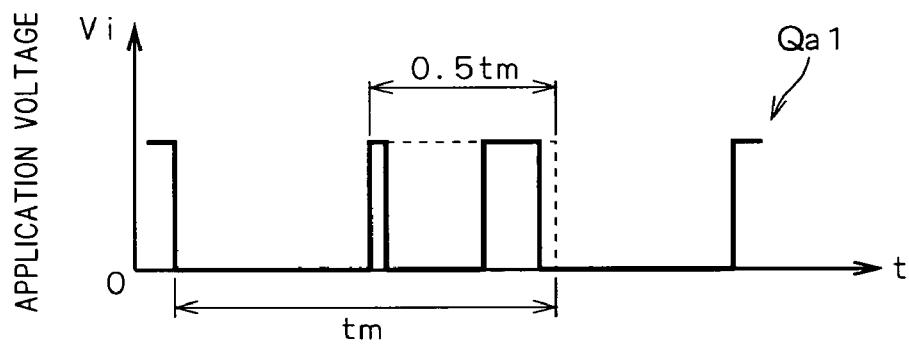
Figure 12C:
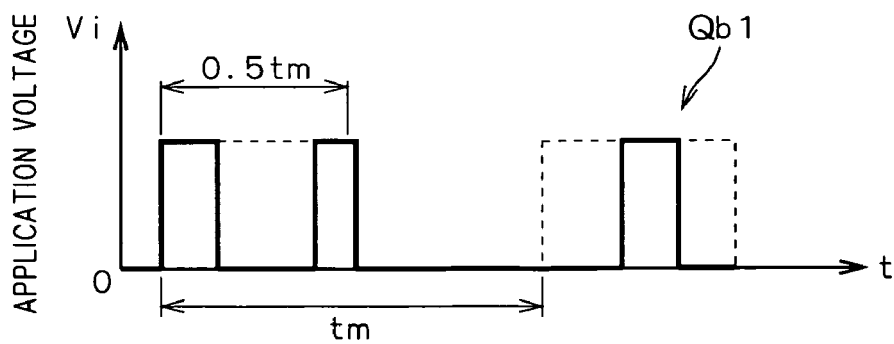
Figure 13A:
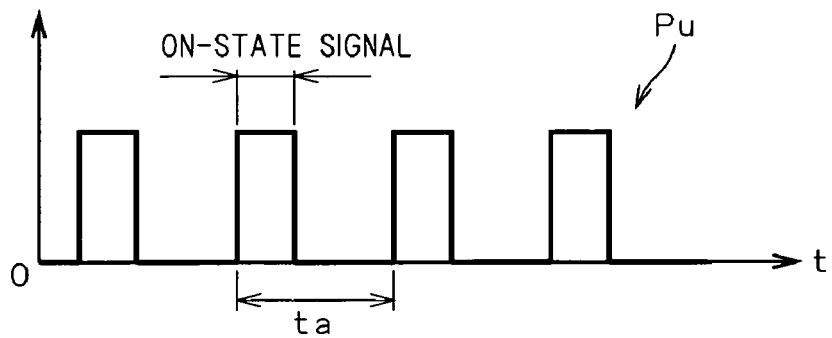
Figure 13B:
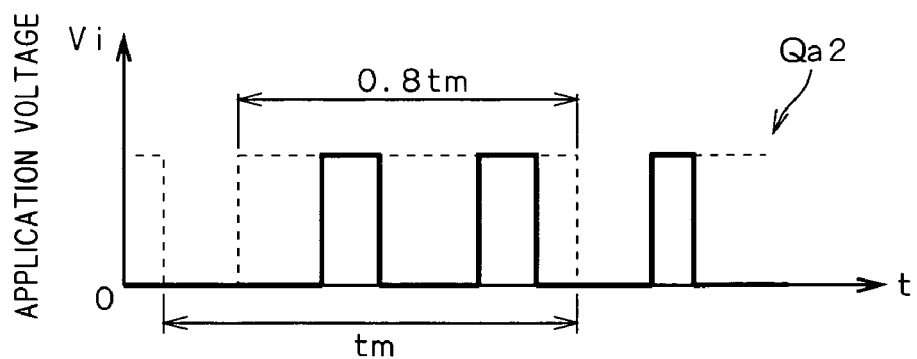
Figure 13C:
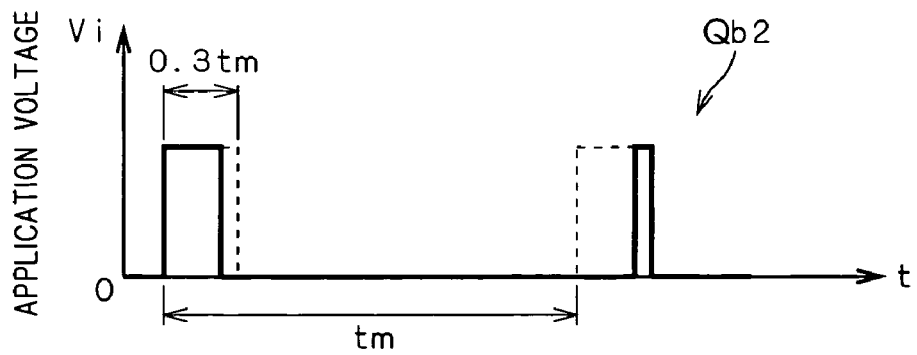

FIGS. 12A to 12C and FIGS. 13A to 13C are diagrams illustrating the operation of the drive unit 2G. FIGS. 12A and 13A show pulse signals for decimating a voltage to be applied to the SMA. FIGS. 12B and 13B show signal waveforms Qa1 and Qa2 of voltages applied to the SMA 25a, and FIGS. 12C and 13C show signal waveforms Qb1 and Qb2 of voltages applied to the SMA 25b.

The control circuit 28G of the seventh preferred embodiment performs a decimation process of the signal waveforms Na1 and Na2 and the signal waveforms Nb1 and Nb2 of the sixth preferred embodiment shown in FIGS. 10A, 10B, 11A and 11B. The signal decimation process will be described concretely below.

In a manner similar to the sixth preferred embodiment, the control circuit 28G generates the signal waveforms Na1 and Na2 and the signal waveforms Nb1 and Nb2 to be applied to the SMAs 25 as shown in FIGS. 10A, 10B, 11A and 11B.

By performing a process of overlapping the signal waveforms Na1 and Na2 and the signal waveforms Nb1 and Nb2 with the pulse signals Pu (FIGS. 12A and 13A) as decimation signals generated in the control circuit 28G, the drive waveforms Qa1 and Qa2 of the SMA 25a shown in FIGS. 12B and 13B and drive waveforms Qb1 and Qb2 of the SMA 25b shown in FIGS. 12C and 13C are generated. The pulse signal Pt has a frequency higher than the pulse frequency of the sixth preferred embodiment shown in FIGS. 10A, 10B, 11A and 11B. The one pulse cycle "ta" shown in FIG. 12A is shorter than the one pulse cycle "tm" shown in FIGS. 12B and 12C.

Since voltages are applied to the SMAs 25a and 25b on the basis of the signal waveforms Qa1 and Qa2 and the signal waveforms Qb1 and Qb2 subjected to the signal decimation process by using the pulse signal Pu, power according to the ratio (duty ratio) between on time and off time of the pulse signal Pu can be reduced. In a manner similar to the fourth preferred embodiment, when the duty ratio corresponding to the signal decimation ratio becomes low, power to displace the SMA 25 to a target position cannot be supplied and performance deteriorates. Consequently, the duty ratio is set so that the average value of the passed current per unit time lies in the SMA transformation temperature region shown in FIG. 3.

By the operation of the drive unit 2D as described above, effects similar to those of the sixth preferred embodiment are produced. Further, the drive current signals of the SMA are decimated, so that power can be saved.

Modification

It is not essential to construct the actuator in each of the aforementioned preferred embodiments so that the expansion/contraction direction of the SMA 25 and the movement direction of the movable part 24 coincide with each other as shown in FIG. 2. The actuator may have a push-pull configuration in which the movable part 24 swings around the fulcrum Co as a center by expansion/contraction of the two SMAs 25 as shown in FIG. 14.

While the invention has been shown and described in detail, the foregoing description is in all aspects illustrative and not restrictive. It is therefore understood that numerous modifications and variations can be devised without departing from the scope of the invention.

What is claimed is:

1. A drive apparatus for driving an actuator having two shape memory alloys connected in a push-pull arrangement to a movable part to give a displacement to said movable part on the basis of a displacement target value, comprising:
    (a) a feeder configured to feed current to a shape memory alloy to be heated on the basis of a drive current signal, thereby making said shape memory alloy perform a regaining operation towards a memorized shape to interlock with said displacement of said movable part; and
    (b) a controller configured to generate a first drive current signal based on said displacement target value for one of said two shape memory alloys which performs said regaining operation and feed a first drive current based on said first drive current signal to said one of said two shape memory alloys, said controller further configured to generate a second drive current signal for another shape memory alloy which does not perform said regaining operation and feed a second drive current based on said second drive current signal to said other shape memory alloy as a bias current while passing said first drive current.

2. The drive apparatus according to claim 1, wherein said bias current is set to a current value necessary to heat said shape memory alloy to a specific temperature in a temperature range from a transformation start temperature to a transformation end temperature of said shape memory alloy, and
said controller includes:
(b-1) a first generator configured to generate said first drive current signal by adding a first current signal according to said displacement target value to said signal of said bias current; and
(b-2) a second generator configured to generate said second drive current signal by subtracting a second current signal according to said displacement target value and a heat radiation characteristic of said shape memory alloy from said signal of said bias current.

3. The drive apparatus according to claim 1, wherein said bias current is set to a current value necessary to heat said shape memory alloy to a specific temperature in a temperature range from a transformation staff temperature to a transformation end temperature of said shape memory alloy, and
said controller includes:
(b-3) a first generator configured to generate said first drive current signal by adding a first current signal according to said displacement target value to said signal of said bias current; and
(b-4) a second generator configured to generate said second drive current signal by subtracting said first current signal from said signal of said bias current.

4. The drive apparatus according to claim 2, wherein said specific temperature is equal to or less than an intermediate temperature between said transformation staff temperature and said transformation end temperature.

5. The drive apparatus according to claim 1, wherein said bias current is set to a current value necessary to heat said shape memory alloy to a transformation start temperature of said shape memory alloy, and
said controller includes:
(b-5) a generator configured to generate said first drive current signal by adding a first current signal according to said displacement target value to said signal of said bias current; and
(b-6) a setter configured to set said signal of said bias current as said second drive current signal.

6. The drive apparatus according to claim 2, wherein said first current signal is an analog signal proportional to said displacement target value.

7. The drive apparatus according to claim 1, wherein said first drive current signal and/or said second drive current signal are/is subjected to a signal decimation process.

8. A drive apparatus for driving an actuator having two shape memory alloys connected in a push-pull arrangement to a movable part to give a displacement to said movable part on the basis of a displacement target value, comprising:
 (a) a feeder configured to feed current to a shape memory alloy to be heated on the basis of a drive current signal, thereby causing said shape memory alloy to perform a regaining operation towards a memorized shape to interlock with said displacement of said movable part; and
 (b) a controller configured to generate a first drive current signal based on said displacement target value for one of said two shape memory alloys which performs said regaining operation and feed a first drive current based on said first drive current signal to said one of said two shape memory alloys, said controller further configured to generate a second drive current signal for another shape memory alloy which does not perform said regaining operation and feed a second drive current based on said second drive current signal to said other shape memory alloy as a bias current while passing said first drive current,
 wherein said first drive current signal is a pulse width modulation signal obtained by adding a first duty ratio according to said displacement target value to a predetermined duty ratio, and said second drive current signal is a pulse width modulation signal obtained by subtracting said first duty ratio from said predetermined duty ratio.

9. The drive apparatus according to claim 8, wherein said predetermined duty ratio is 50%, and said first drive current signal and second drive current signal are signals complementary to each other.

10. The drive apparatus according to claim 1, wherein said drive apparatus is used for correcting a camera shake of an image capturing apparatus.

11. A drive system for giving a displacement to a movable part on the basis of a displacement target value, comprising:
 (a) an actuator having two shape memory alloys connected in a push-pull arrangement to said movable part;
 (b) a feeder configured to feed current to a shape memory alloy to be heated on the basis of a drive current signal, thereby making said shape memory alloy perform a regaining operation towards a memorized shape to interlock with said displacement of said movable part; and
 (c) a controller configured to generate a first drive current signal based on said displacement target value for one of said two shape memory alloys which performs said regaining operation and feed a first drive current based on said first drive current signal to said one of said two shape memory alloys, said controller further configured to generate a second drive current signal for another shape memory alloy which does not perform said regaining operation and feed a second drive current based on said second drive current signal to said other shape memory alloy as a bias current while passing said first drive current.

12. A drive system for giving a displacement to a movable part on the basis of a displacement target value, comprising:
 (a) an actuator having two shape memory alloys connected in a push-pull arrangement to said movable part;
 (b) a feeder configured to feed current to a shape memory alloy to be heated on the basis of a drive current signal, thereby performing a regaining operation towards a memorized shape to interlock with said displacement of said movable part; and
 (c) a controller configured to generate a first drive current signal based on said displacement target value for one of said two shape memory alloys which performs said regaining operation and feed a first drive current based on said first drive current signal to said one of said two shape memory alloys, said controller further configured to generate a second drive current signal for another shape memory alloy which does not perform said regaining operation and feed a second drive current based on said second drive current signal to said other shape memory alloy as a bias current while passing said first drive current,
 wherein said first drive current signal is a pulse width modulation signal obtained by adding a duty ratio according to said displacement target value to a predetermined duty ratio, and said second drive current signal is a pulse width modulation signal obtained by subtracting the duty ratio according to said displacement target value from said predetermined duty ratio.

13. A drive method for driving an actuator having two shape memory alloys connected in a push-pull arrangement to a movable part to give displacement to said movable part on the basis of a displacement target value, comprising the steps of:
 (a) feeding current to a shape memory alloy to be heated on the basis of a drive current signal, thereby making said shape memory alloy perform a regaining operation towards a memorized shape to interlock with said displacement of said movable part; and
 (b) generating a first drive current signal based on said displacement target value for one of said two shape memory alloys which performs said regaining operation and feeding a first drive current based on said first drive current signal to said one of said two shape memory alloys; and
 (c) generating a second drive current signal for another shape memory alloy which does not perform said regaining operation and feeding a second drive current based on said second drive current signal to said other shape memory alloy as a bias current while passing said first drive current.

14. The drive method according to claim 13, wherein said bias current is set to a current value necessary to heat said shape memory alloy to a specific temperature in a temperature range from a transformation start temperature to a transformation end temperature of said shape memory alloy,
 said step (b) includes the step of:
 generating said first drive current signal by adding a first current signal according to said displacement target value to said signal of said bias current, and
 said step (c) includes the step of:
 generating said second drive current signal by subtracting a second current signal according to said displacement target value and a heat radiation characteristic of said shape memory alloy from said signal of said bias current.

15. The drive method according to claim 13, wherein said bias current is set to a current value necessary to heat said shape memory alloy to a specific temperature in a temperature range from a transformation start temperature to a transformation end temperature of said shape memory alloy, said step (b) includes the step of:

generating said first drive current signal by adding a first current signal according to said displacement target value to said signal of bias current, and said step (c) includes the step of:

generating said second drive current signal by subtracting said first current signal from said signal of said bias current.

* * * * *

UNITED STATES PATENT AND TRADEMARK OFFICE
CERTIFICATE OF CORRECTION

PATENT NO. : 7,650,752 B2
APPLICATION NO. : 11/294512
DATED : January 26, 2010
INVENTOR(S) : Masamichi Oohara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twenty-eighth Day of December, 2010

David J. Kappos
*Director of the United States Patent and Trademark Office*